(12) United States Patent
Fantone

(10) Patent No.: US 6,433,943 B1
(45) Date of Patent: Aug. 13, 2002

(54) METHOD FOR MANUFACTURING ROOF MIRRORS

(75) Inventor: Stephen D. Fantone, Lynnfield, MA (US)

(73) Assignee: Mobi Corporation, Lynnfield, MA (US)

(*) Notice: Subject to any disclaimer, the term of this patent is extended or adjusted under 35 U.S.C. 154(b) by 1 day.

(21) Appl. No.: 09/712,445

(22) Filed: Nov. 14, 2000

Related U.S. Application Data

(62) Division of application No. 09/533,882, filed on Mar. 22, 2000, now abandoned.
(60) Provisional application No. 60/125,523, filed on Mar. 22, 1999.

(51) Int. Cl.[7] .............................. G02B 23/00; G02B 5/04
(52) U.S. Cl. ....................... 359/900; 359/407; 359/431; 359/831
(58) Field of Search ................................. 359/399, 407, 359/431, 831–839, 900

(56) References Cited

U.S. PATENT DOCUMENTS

| 3,162,715 A | 12/1964 | Scidmore | 359/432 |
|---|---|---|---|
| 3,409,343 A | 11/1968 | Zapp | 359/432 |
| 3,985,421 A | 10/1976 | Beecher | 359/407 |
| 4,013,340 A | 3/1977 | Mukai et al. | 359/407 |
| 4,526,444 A | 7/1985 | Fantone et al. | 359/431 |
| 4,605,290 A | 8/1986 | Burns | 359/431 |
| 4,719,493 A | * 1/1988 | Maiorano | |

FOREIGN PATENT DOCUMENTS

| JP | 61-151608 | * 7/1986 |
|---|---|---|
| JP | 11-212142 | * 8/1999 |

* cited by examiner

*Primary Examiner*—Thong Nguyen
(74) *Attorney, Agent, or Firm*—Francis J. Caufield

(57) ABSTRACT

A compact binoculars utilizing roof mirrors is disclosed. Compactness of the binoculars is achieved by maintaining the optical axis in the same plane as the axes of movement of the focusing apparatus and eyewidth adjustment apparatus. A method of manufacturing the roof mirror is also disclosed. The method allows produces and inexpensive and precisely aligned roof mirror for use in the compact binoculars.

3 Claims, 21 Drawing Sheets

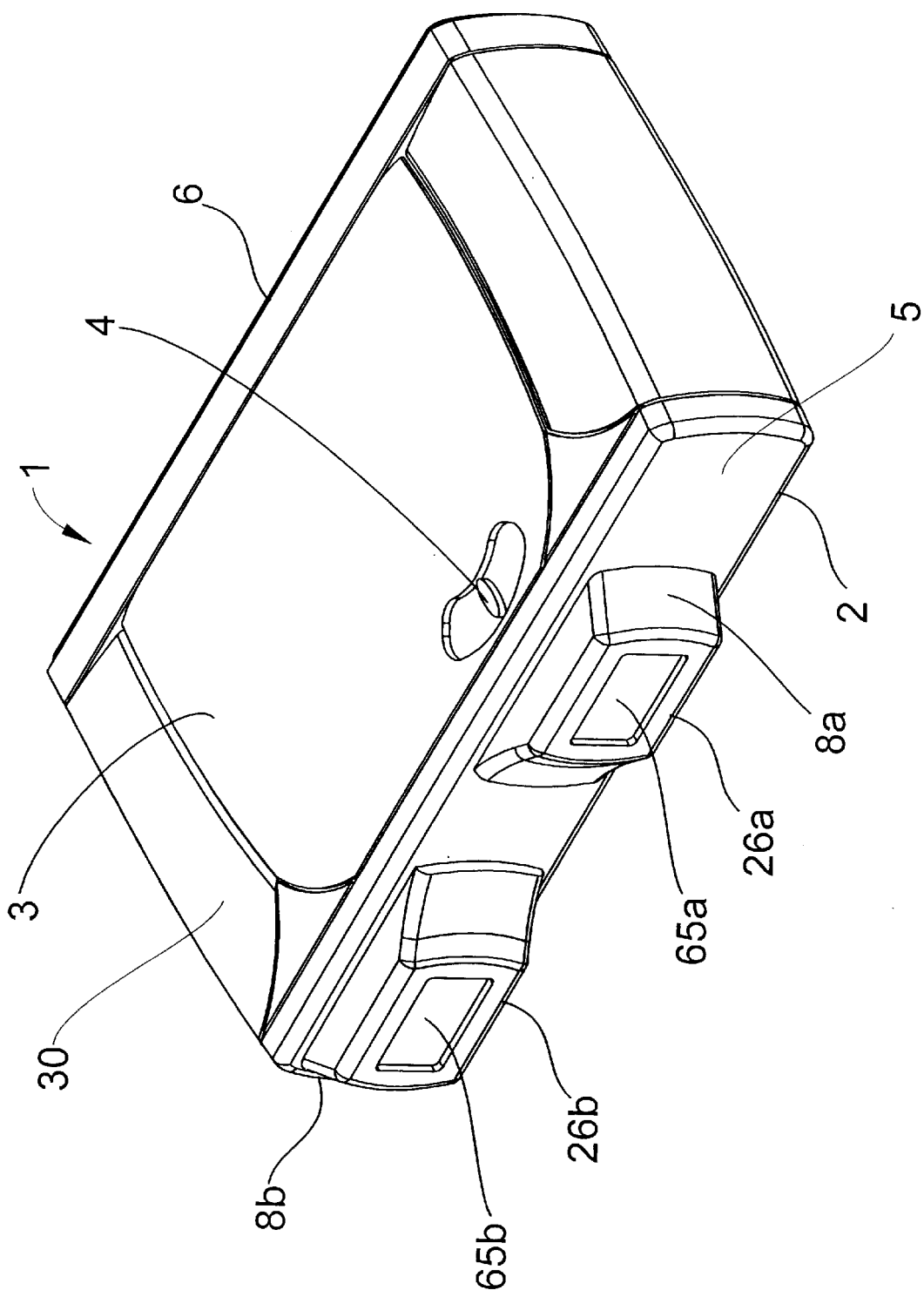

METHOD FOR MANUFACTURING ROOF MIRRORS

CROSS REFERENCE TO RELATED APPLICATIONS

This application is a divisional of copending U.S. patent application Ser. No. 09/533,882 filed on Mar. 22, 2000, now abandoned which, in turn, claimed priority from U.S. Provisional Patent Application No. 60/125,523 filed on Mar. 22, 1999 and entitled "Compact Binoculars"; both of the foregoing applications being incorporated herein by reference in their entirety.

BACKGROUND

Conventional binoculars require optics, which have both a wide-field of view and relatively high magnification. In addition, the optical design must produce an image that is correctly oriented (right-side up) with respect to the scene that is being viewed. Various image enlargement devices and techniques have been available for many years, but all conventional arrangements have drawbacks. For example, the field of view of certain telescopes is limited to the diameter of the objective lens. Thus, it cannot simultaneously have a wide field-of-view and high magnifying power. Other telescopes allow for both a wide field of view and high magnifying power, but the image is inverted.

In order to solve the problem of an inverted image, many binoculars use an additional set of lens to invert the image. Other devices include use a reflective surface to invert the image. Some devices use reflective surfaces at right angles. The double reflection introduced by the reflecting surfaces causes an inversion of an image about a single axis. Typically a pair of right angle prisms is placed between the objective lens and the eyepiece in the telescope image enlargement optics. One prism inverts the image around the horizontal axis, the second prism inverts the image around the vertical axis. As a result the image viewed in the eyepiece is correctly oriented. One problem associated with a pair of right angle prisms is that they must be oriented at right angles relative to each other to provide proper image erection. As a result it is difficult to use them in a compact binoculars.

The configurations described above have the problem that the optical axis does not lie in a single plane. Although it is possible to tilt a prismatic optical system within the binocular case to keep the optical axis in a single plane, this type of configuration results in much unused volume making it difficult to create a compact binoculars.

Another device used in binoculars is the roof prism. The optical axes of light entering and leaving the prism are collinear. The roof prism provides inversion about the horizontal axis, and the other two reflecting surfaces provide inversion about the vertical axis.

Other binocular designs are compact and permit construction into cylindrical barrels whose diameter is not much larger than the objective lens. This configuration uses prisms in close proximity. However, this solution is expensive. It is noted that mirrors cannot be used in lieu of the prism since on the prism one surface serves both as a reflective surface and as a window.

Further prism optical designs use in line optical layouts. All of the prism designs suffer the same problem: Extreme accuracy is needed in fabrication of the roof prism. If the roof prism is not exactly 90 degrees then the real image formed by the objective lens will be found to be imperfect.

Most binoculars, which utilize prisms, use solid glass prisms, which are generally expensive to manufacture. Some attempts have been made to replace the prism reflecting surfaces by piano mirror reflecting surfaces. Such use of mirrors to replace the prisms became practical with the development of high-reflectivity, first surface mirrors. However, replacement of the prism surfaces with mirrors requires that the mirrors be accurately aligned. If any of the mirror surfaces are slightly misaligned relative to each other, the optical image will be slightly off-center. This problem is serious in binocular optical systems, where the images in both optical system legs must appear to fuse perfectly. A vertical image displacement of 10 milliradians is easily noticed by the average viewer. Consequently, the recommended tolerance is only 1 milliradian. An adjustment in the location and/or tip of at least one of the optical elements is generally necessary.

The manufacture of accurately aligned mirrors for replacement of prisms in binoculars remains an expensive problem. As a result binoculars remain both bulky and expensive. There is a need for a compact, inexpensive binocular arrangement, which has relatively high magnification power.

SUMMARY OF THE INVENTION

In general, in one aspect, a compact binoculars, including a housing having a base and a light tight lid, first and second molecular telescopes having an upper and a lower surface oriented within the housing in a substantially parallel configuration, wherein the first and second monocular telescopes include a shell case having a support base and a light tight cover, an objective lens, having an objective optical axis, adjustably mounted to a first side of said shell case, a magnifying eyepiece, having an eyepiece optical axis, mounted to a second side of the shell case parallel to the objective lens, a first reflective surface having a first axis perpendicular to the first reflective surface, and mounted to the second side at an angle with respect to the second side, a second reflective surface having a second axis perpendicular to the second reflective surface, and mounted to a third side of the shell case, perpendicular to the first and second sides, a roof mirror having a third reflective surface and a fourth reflective surface forming a substantially 90 degree angle, the roof mirror having a roof axis bisecting the angle and perpendicular to a line of meeting of the third and fourth reflective surfaces, wherein the roof mirror is mounted to the base of the shellcase, a guideplate mechanically coupled to the upper surfaces of the first and second monocular telescopes, a stabilizing bar mechanically coupled to the first and second monocular telescopes.

In an implementation, the optical axis, the first axis, the second axis, the roof axis, the eyepiece optical axis, and the line of meeting being in a plane so that a path of light from a distant object encounter, in sequence, the objective lens, the first reflective surface, the second reflective surface, the roof mirror, and the magnifying eyepiece.

In another implementation, the guideplate allows a first motion in a direction substantially perpendicular to the objective optical axis and the eyepiece optical axis.

In another implementation, the guideplate allows a second motion in a direction substantially perpendicular to the first motion.

In yet another implementation, the second motion comprises moving the objective lens of the first monocular telescope and the objective lens of the second monocular telescope in tandem.

In still another implementation, the first the second, the third, and the fourth reflective surfaces are first surface mirrors.

In another implementation the binoculars further include a focus mechanism mechanically coupled to the guideplate.

In another implementation the binoculars further include an eyewidth adjustment mechanism coupled to the guideplate.

In another implementation, the roof mirror further includes a glass substrate adhesively attached to an end of each of the first and second reflective surfaces.

In another implementation, the roof prism is held in position by a brace.

In another aspect, a method of manufacturing a roof mirror is featured including placing a first reflective surface and a second reflective surface on a precision fixture such that a first end of the first reflective surface meets a first end of the second reflective surface at a substantially 90 degree angle, optically checking the alignment of the reflective surfaces, applying an adhesive along a line where the first end of the first reflective surface and the first end of the second reflective surface meet, allowing the adhesive to set, verifying that the angle between the first and second reflective surfaces has remained substantially 90 degrees, applying an adhesive along a second end of the first reflective surface and a second end of the second reflective surface, wherein the second end of the first reflective surface and the second end of the second reflective surface meet at a common point, applying a substantially rectangular glass substrate to the second end of the first reflective surface and the second end of the second reflective surface, allowing the adhesive to set and optically checking the alignment of the mirrors.

In an implementation, optically checking the mirrors includes using an autocollimater.

In another implementation, applying an adhesive includes applying an ultraviolet glue.

Other features and advantages will be apparent from the following description, the accompanying drawings and the claims.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1A illustrates a perspective view of a compact binoculars according to the invention.

DETAILED DESCRIPTION

Figure 1B:
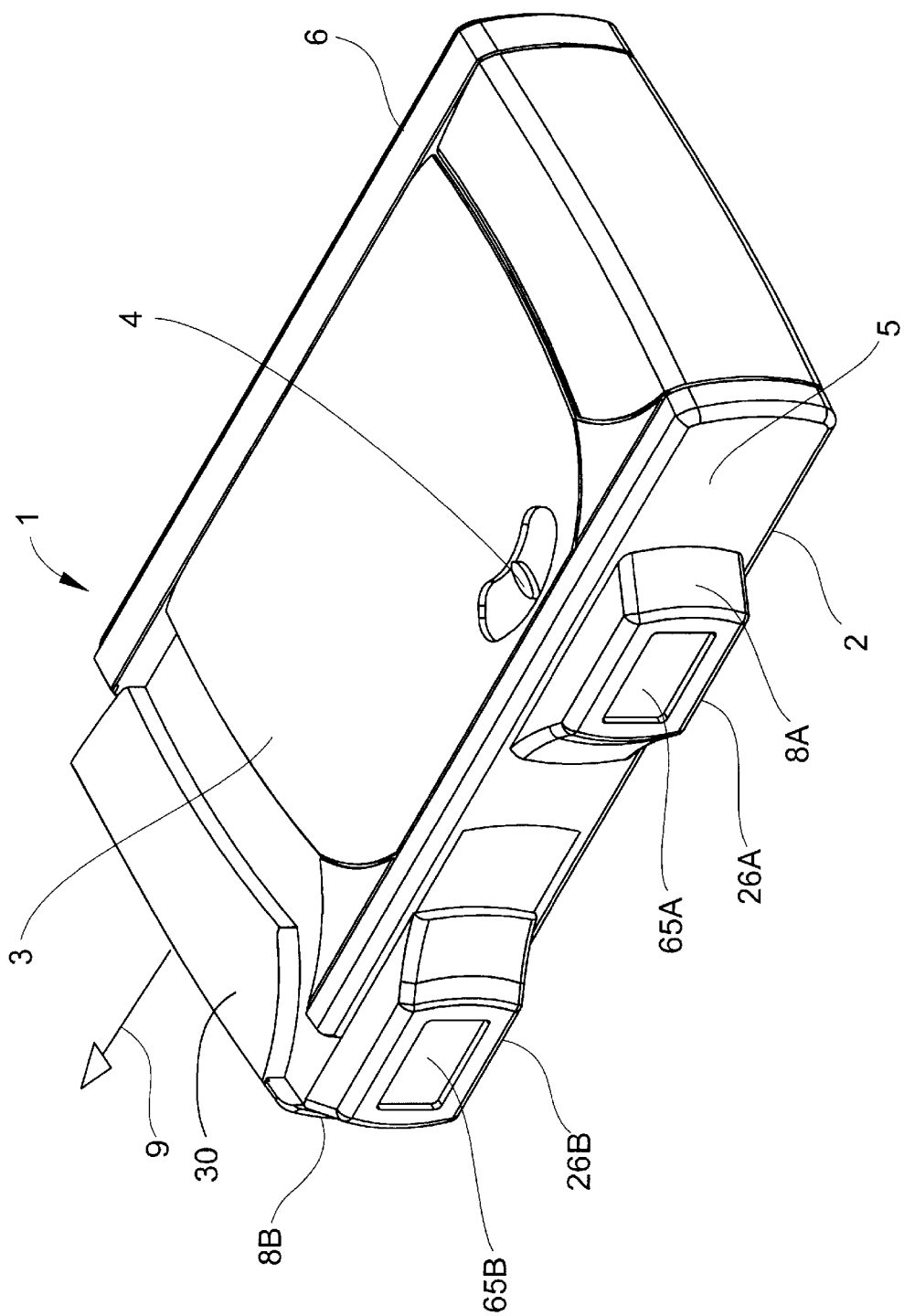
FIG. 1B illustrates a perspective view of a compact binoculars of FIG. 1A in an extended orientation.

FIG. 1A, depicts a top perspective view of a compact binocular 1. The binocular 1 is substantially rectangular and has a base 2 and a light tight cover 3. The light tight cover 3 is removable from the base 2. The base 2 and the light tight cover 3 are held together by any suitable attachment means, such as adhesive, mechanical fasteners, such as snaps, or ultrasonic welding. It is understood that the attachment means can be any suitable means and are not limited to the means recited above. Oculars 26a, 26b are disposed on a back edge 5 of the compact binoculars 1. Oculars 26a, 26b are designed for a user to view a distant object (not shown). Oculars 26a, 26b are comprised of a cushioning member 8a, 8b for creating a soft contact for a viewers eyebrow and nose bridge, and an eye-lens 65a, 65b as part of magnification optics which will be discussed below. Ocular 26a, 26b have further components that will be discussed below.

Lever 4 is used as a focus mechanism and will be discussed further below. Grip 30 is used to adjust the spacing between oculars 26a; 26b so that a viewer can adjust the distance between the oculars 26a, 26b to make binoculars 1 fit each viewers' unique facial features. Grip 30 is pictured in its fully recessed position. When grip 30 is in the fully recessed position, oculars 26a, 26b have a minimum distance between them.

FIG. 1B illustrates the compact binoculars 1 with grip 30 in a fully extended position. Arrow 9 indicates the direction in which grip 30 has been extended. When grip 30 is in the fully extended position, oculars 26a, 26b have a maximum distance between them.

Figure 1C:
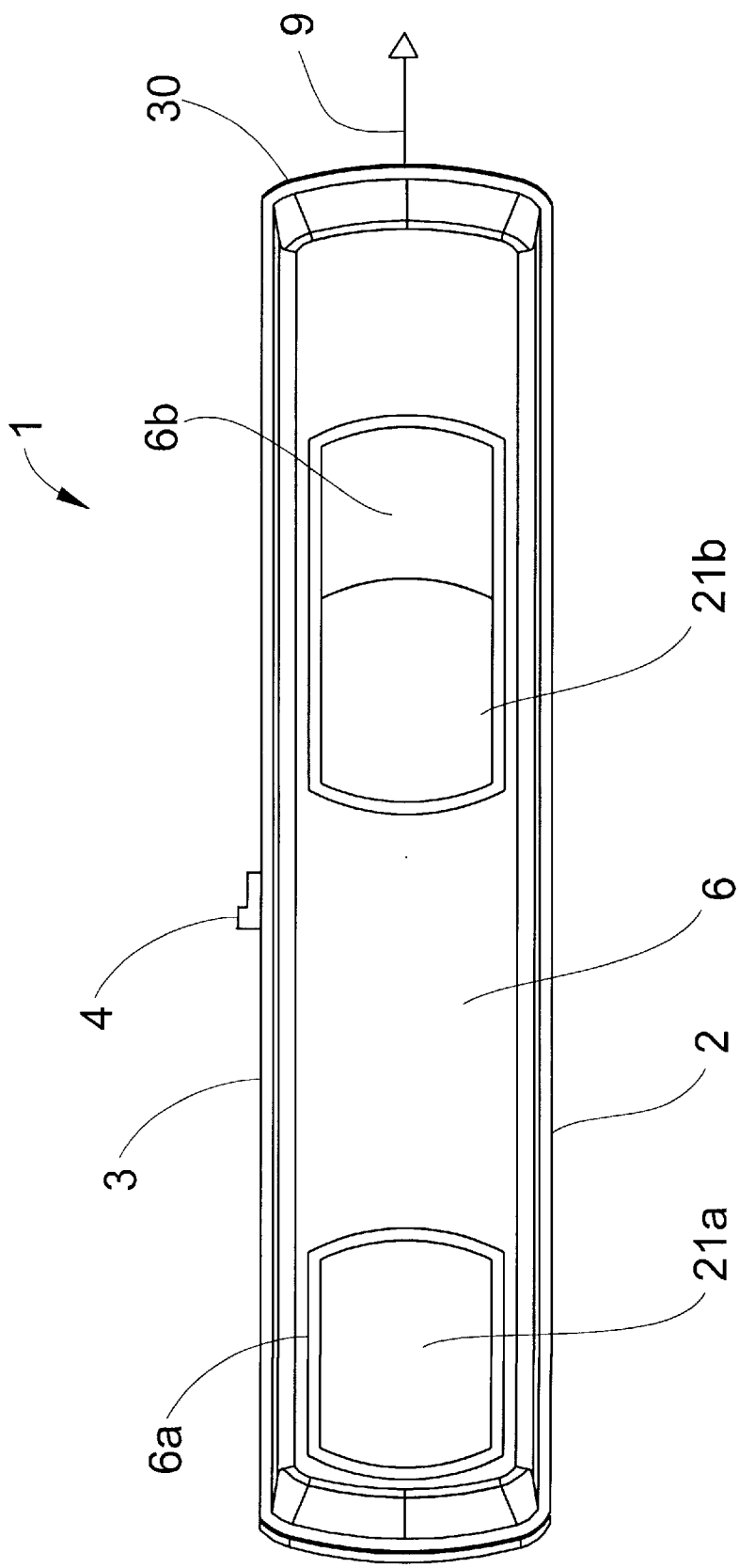
FIG. 1C illustrates a front view of a compact binoculars.

FIG. 1C depicts a view of a front edge 6 of compact binoculars 1. Protective cover 3 provides protection for objective lenses 21a,21b and other inner optical components (shown in FIGS. 6A and 6B) from dust and other external contaminants, as well as provides a transparent medium through which light from external objects can pass to provide ultimate magnification at oculars 26a, 26b. Window 6a provides the transparent medium for light to reach objective lens 21a. Window 6b provides a transparent medium for light to reach another objective lens 21b. Window 6b is wider than window 6a to accommodate movement of the objective lens seen in window 6b when grip 30 is displaced side to side.

Figure 1D:
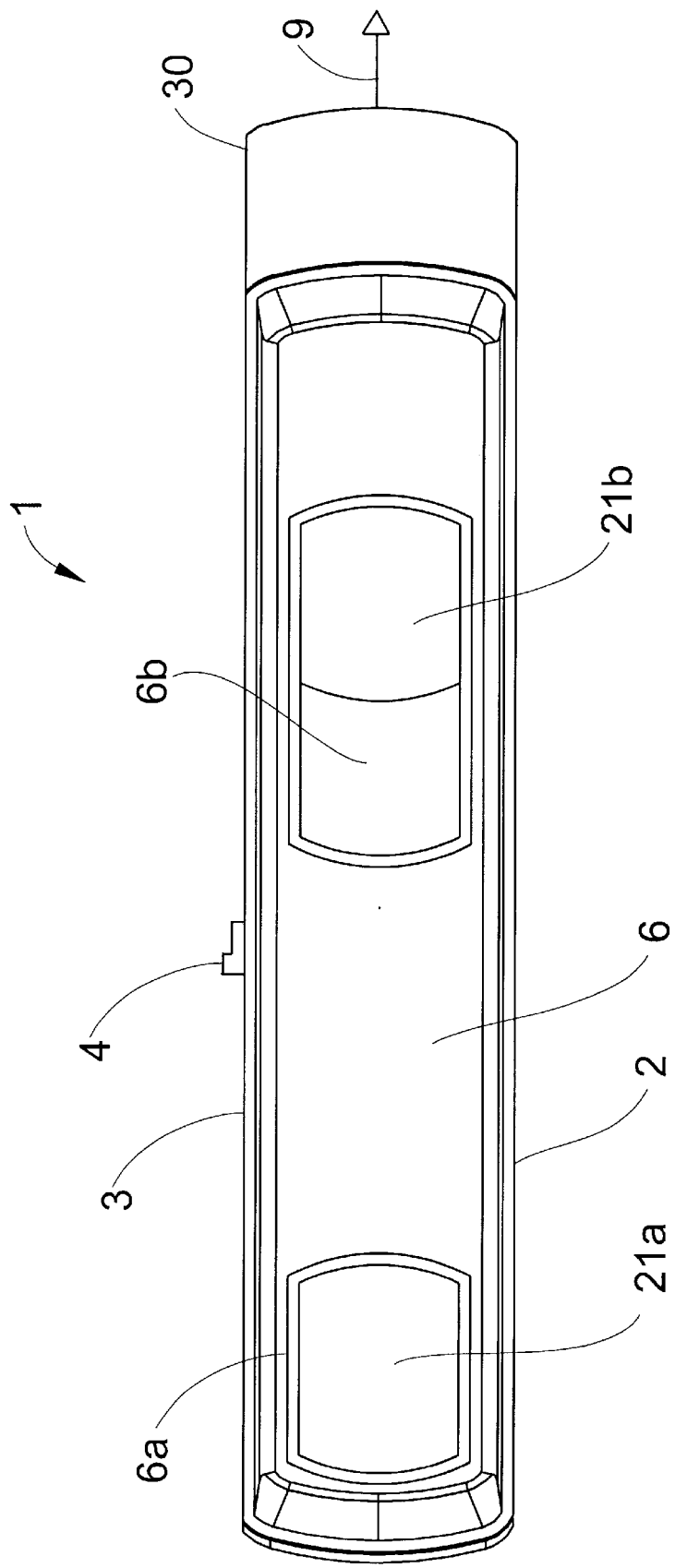
FIG. 1D illustrates a view of a compact binoculars of FIG. 1C in an extended orientation.

FIG. 1D illustrates the compact binocular 1 when grip 30 is in the fully extended position. Objective lens 21b through window 6b has correspondingly been displaced in the direction of arrow 9 along with grip 30.

Figure 2A:
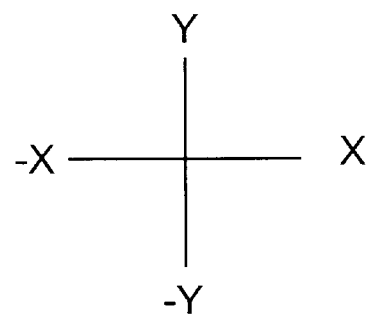
FIG. 2A illustrates a view of a monocular telescope with an eyepiece in one orientation.
Figure 2A:
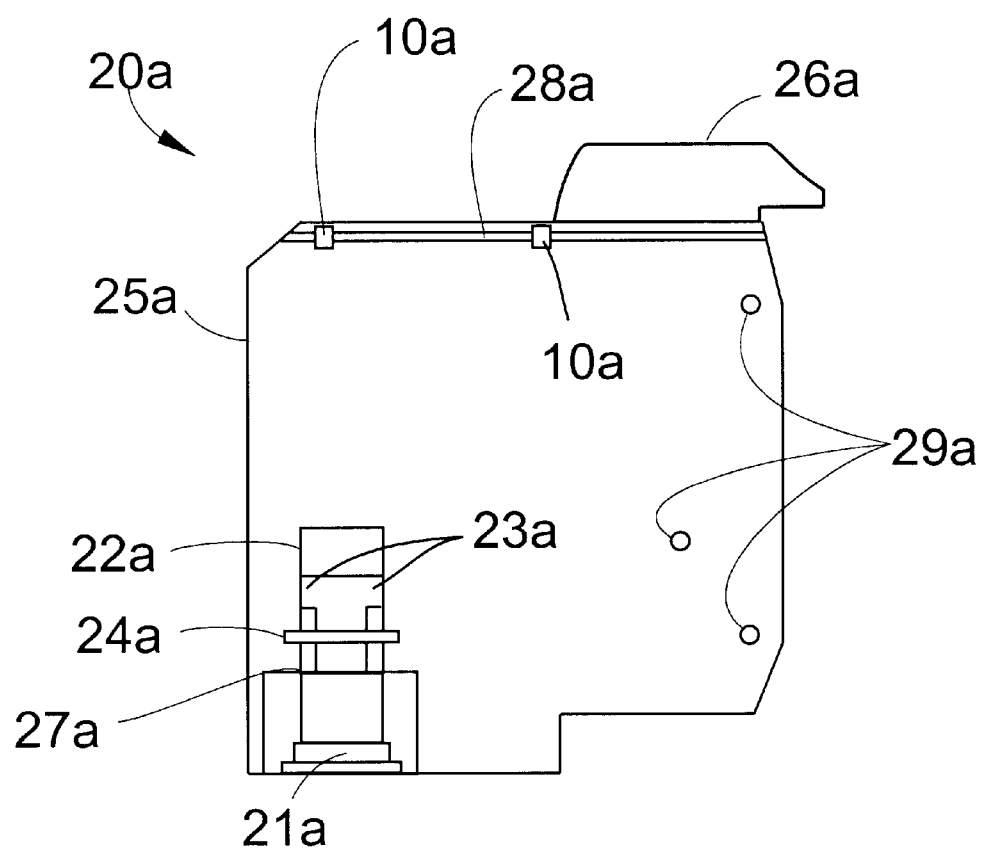
Figure 2B:
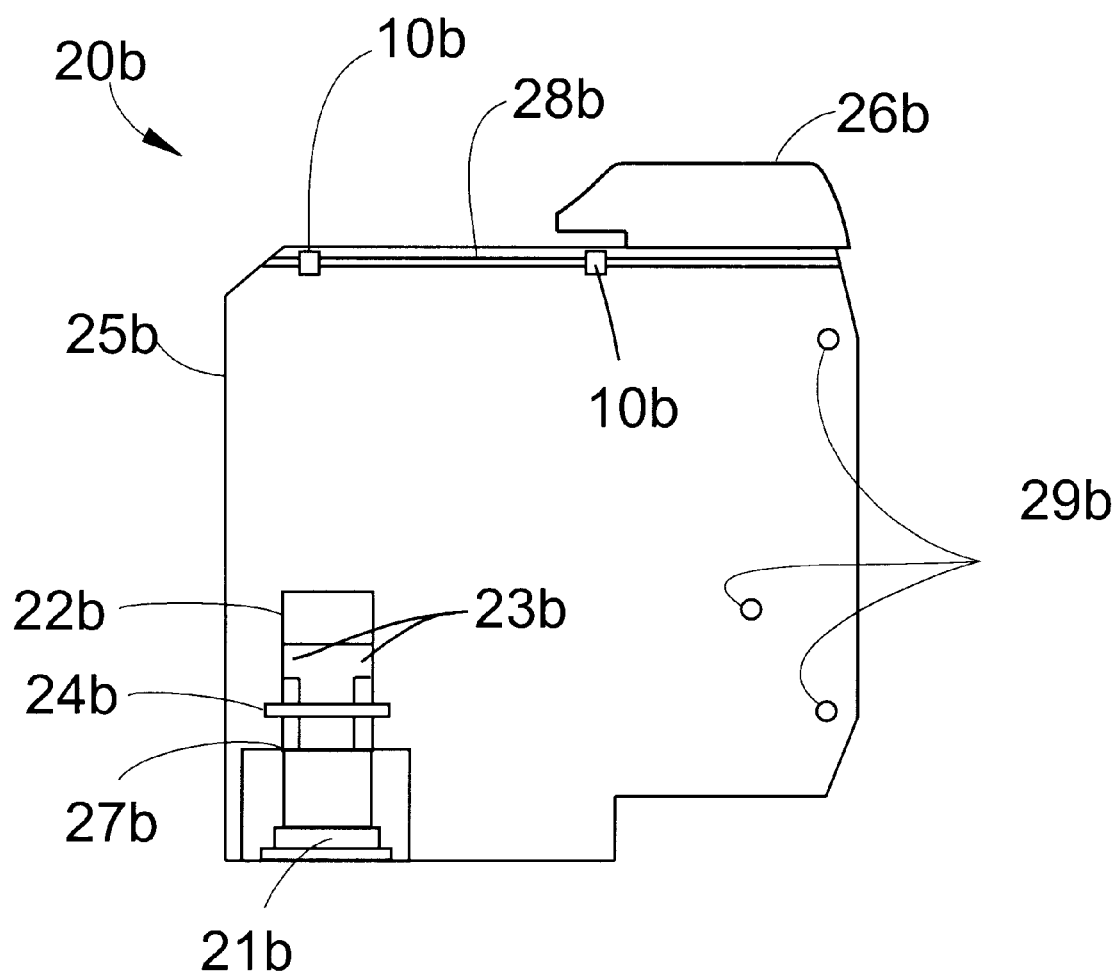
FIG. 2b illustrates a view of a monocular telescope with an eyepiece in another orientation.

FIGS. 2A and 2B depict a pair of monocular telescopes 20a, 20b. The two monocular telescopes 20a and 20b are identical in construction. However, oculars 26a, 26b are oriented in opposite directions in order to ergonomically fit a viewers eyes and nose bridge. It is understood that there are variations in the manufacture of a mass produced good. A Cartesian coordinate system in two dimensions has been added to the figure in order to provide a reference system for the discussion of optical component motion. Referring first to FIG. 2A, the monocular telescope 20a has a shell case 25a. The shell case 25a is substantially rectangular. Shellcase 25a also has a cover (not shown) located on the side opposite the side shown in the figure. Ocular 26a is located at one end of the shell case 25a. FIG. 2A illustrates the ocular 26a in a first orientation. FIG. 2B illustrates the ocular 26b in a second orientation which is reversed from ocular 26a. As stated above the reversed orientation is to accommodate a viewers eyes and nosebridge. Objective lens 21a is located on an end of the shell case 25a parallel to the end containing the ocular 26a. Objective lens 21a is mounted in lens holder 27a that can move axially along lens holder track 22a in they and −y direction. Lens holder 27a is held in lens holder track 22a by wings 23a and guideplate coupler 24a. Guideplate coupler 24a has additional functionality that will be described below. Guidepins 29a will be described below. Track 28a runs parallel to ocular 26a. Track 28a and track fasteners 10a will be described below.

FIG. 2B contains elements that are analogous to those in FIG. 2A.

Figure 3A:
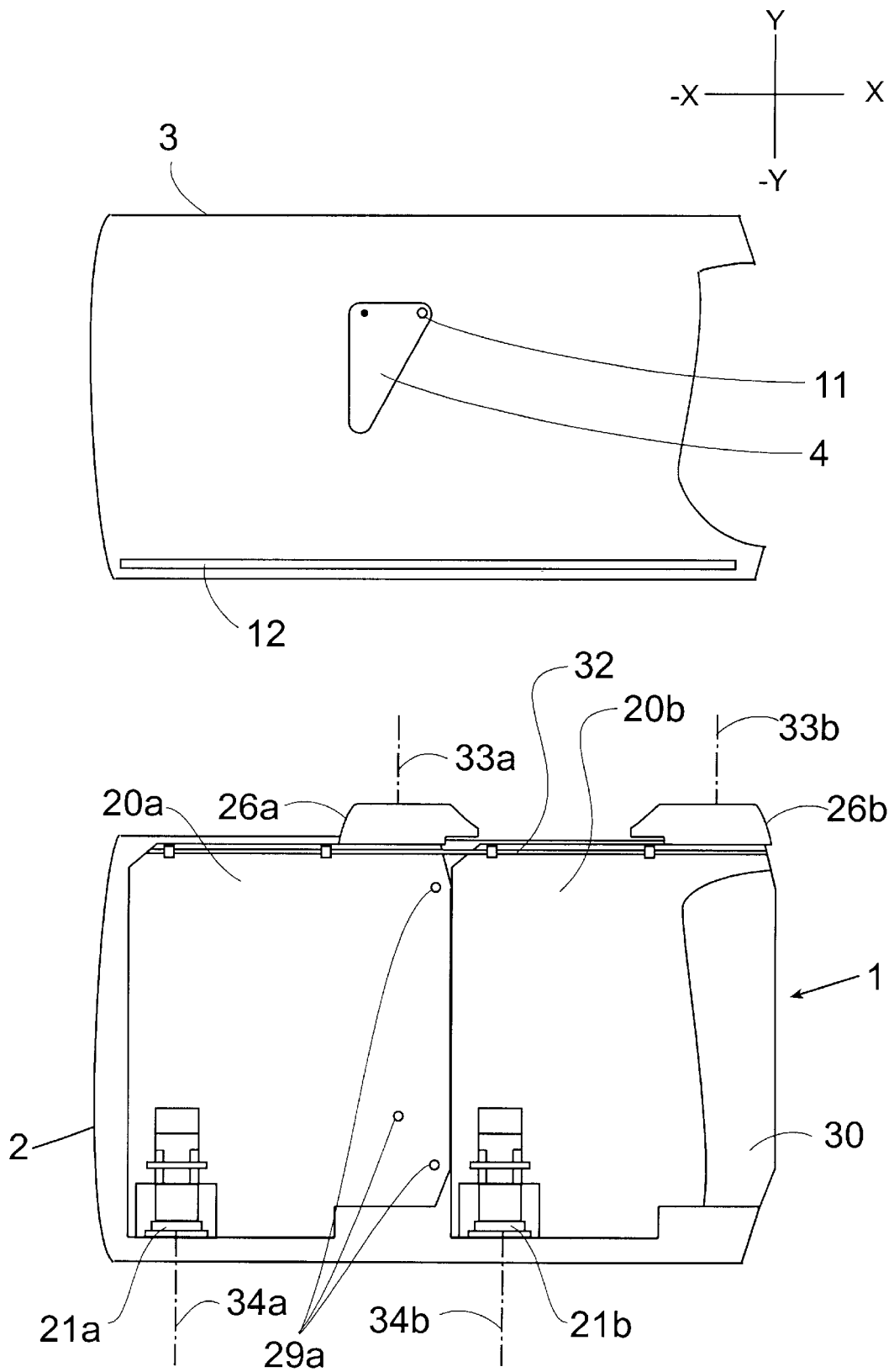
FIG. 3A illustrates two monocular telescopes in an unextended binocular housing.

FIG. 3A depicts the compact binoculars 1 with light tight cover 3 removed. Base 2 contains the two molecular telescopes 20a, 20b. The telescopes 20a and 20b are laid out side by side within base 2 (see FIGS. 1A and 1B). The orientation is such that the oculars are located at one end of the outer housing, and the objective lenses are located diagonally opposite at another end of the outer housing, parallel to the end containing the eyepieces. More specifically, eyepiece lens axes 33a, 33b are parallel in the x-y plane, and objective lens axes 34a, 34b are parallel in the x-y plane. The figure shows grip 30 in its fully recessed position. As a result monocular telescopes 20a, 20b are in contact with each other along an adjacent edge. Light tight cover 3 has been turned over in the upper view of FIG. 3A to show the inside of the light tight cover 3. Lever 4 is depicted from the inside of light tight cover 3. A pin 11 and a track 12 will be explained below.

Figure 3B:
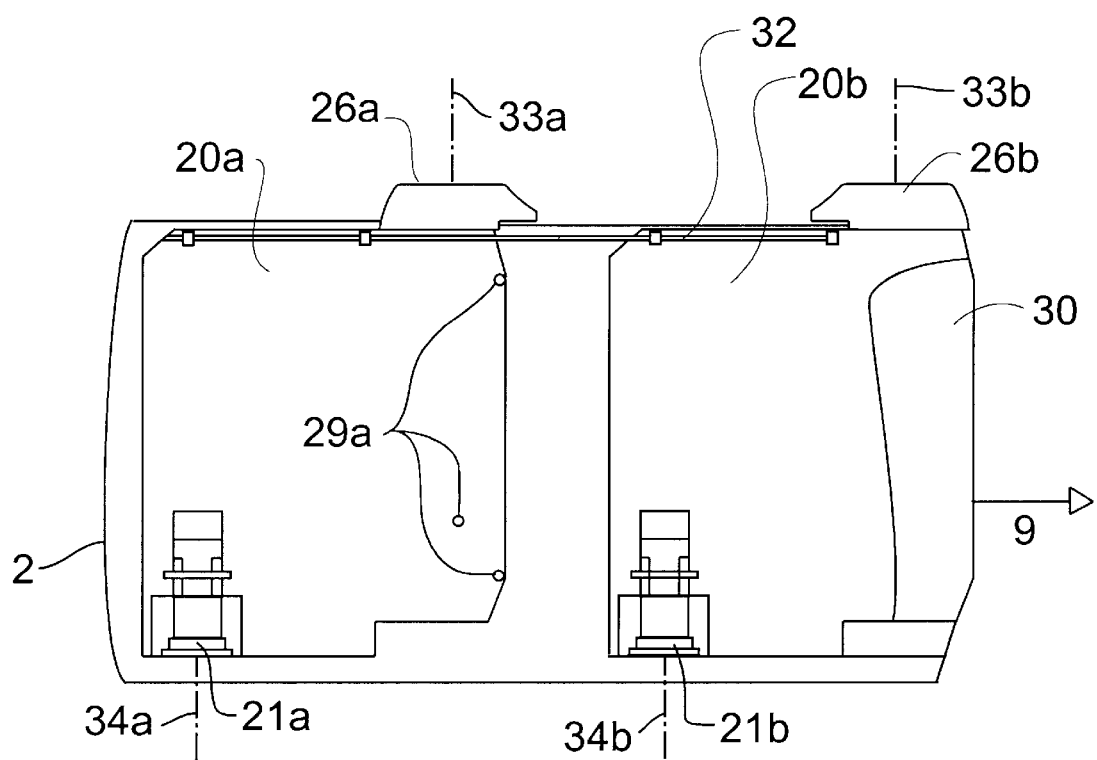
FIG. 3B illustrates two monocular telescopes in the binocular housing of FIG. 3A in an extended configuration.

FIG. 3B depicts the compact binoculars 1 with light tight cover 3 removed. The figure further depicts grip 30 in the fully extended position. Monocular telescopes 20a, 20b are no longer in contact but are rather displaced from each other.

Figure 4A:
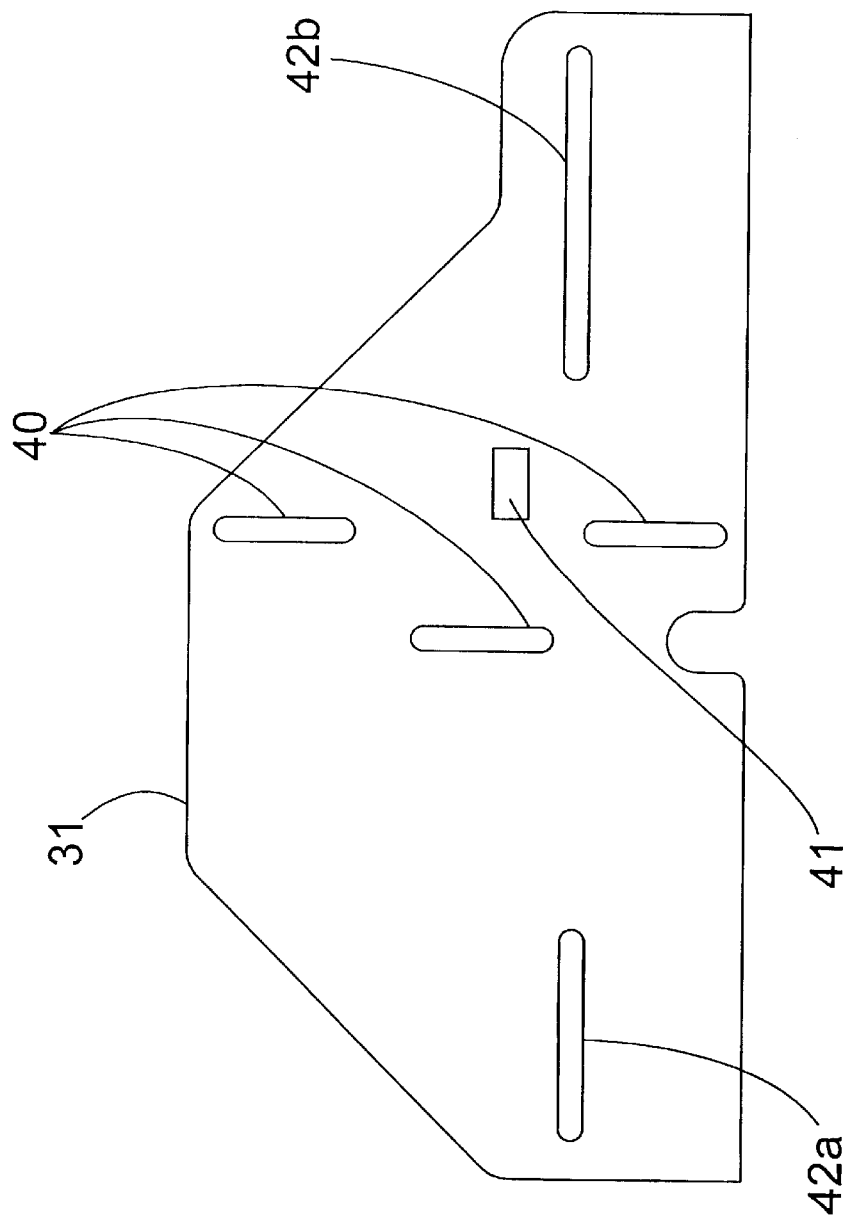
FIG. 4A illustrates a guideplate.
Figure 4B:
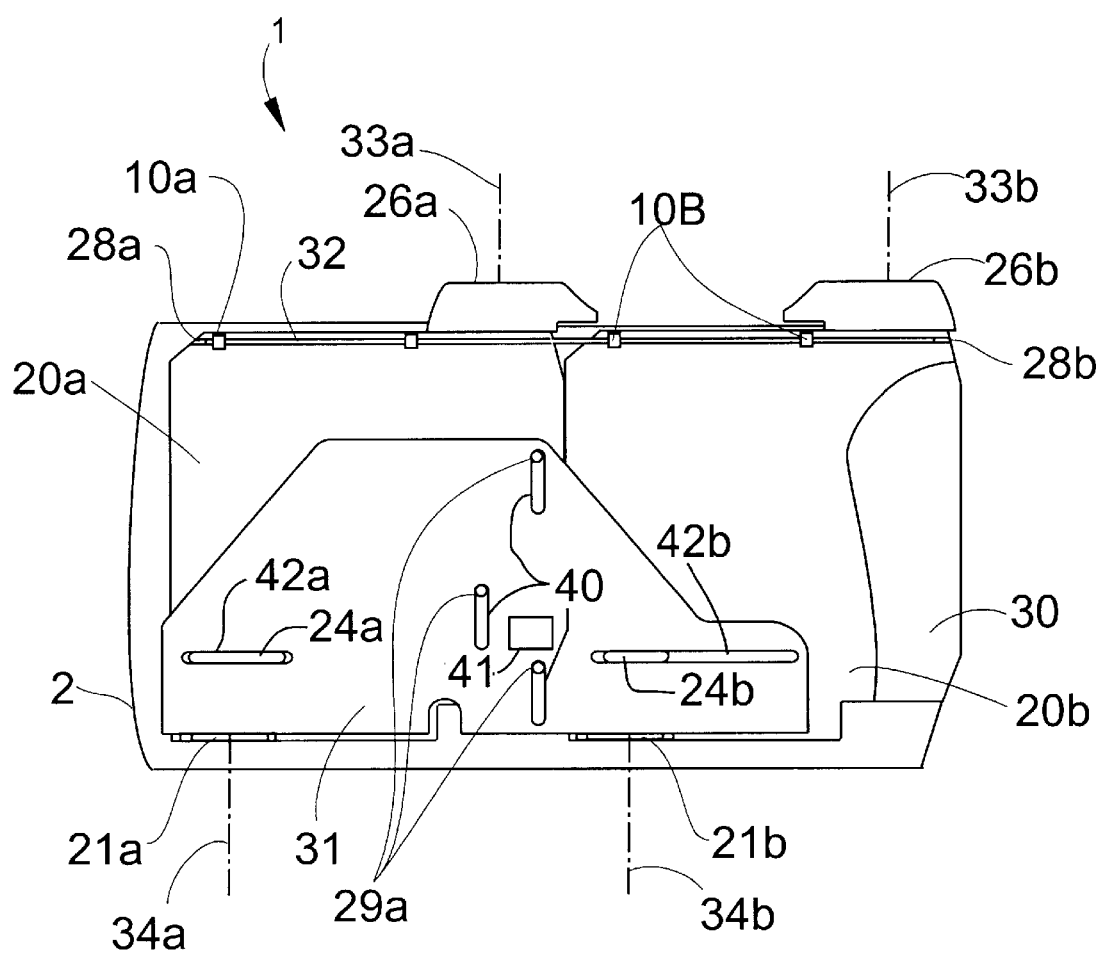
FIG. 4B illustrates two monocular telescopes assembled withthe guideplate of FIG. 4A in an unextended binocular housing.

FIG. 4A depicts a guideplate 31. Giuldeplate 31 contains a set of apertures for various purposes, and FIG. 4B depicts compact binocular 1 with light tight cover 3 removed showing guideplate 31 resting on monocular telescopes 20a, 20b. Guideplate 31 couples with telescopes 20a and 20b to allow displacement in both the y and −y direction, and in the x and −x direction. Referring again to FIG. 4A, apertures 40 are cut from guideplate 31 in order to mechanically engage guidepins 29a so that guideplate 31 can be displaced in the y and −y direction. Aperture 41 is designed to engage pin 11 on lever 4 (see FIG. 3A). As stated above, lever 4 is used to adjust the focus of binocular 1. Apertures 42a and 42b engage guideplate coupler 24a, 24b, respectively, of each monocular telescope 20a, 20b, respectively. Thus, when lever 4 is moved by a viewer in order to obtain a clear focus pin 11 engages aperture 41, and guideplate 31 is displaced in the y and −y direction, along guidepins 29a via apertures 40. During this displacement, guideplate 31 engages guideplate couplers 24a, 24b via apertures 42a and 42b, respectively, thus displacing lens holders 27a, 27b, and thus objective lenses 21a, 21b of monocular telescopes 20a and 20b in the y and −y direction.

Figure 4C:
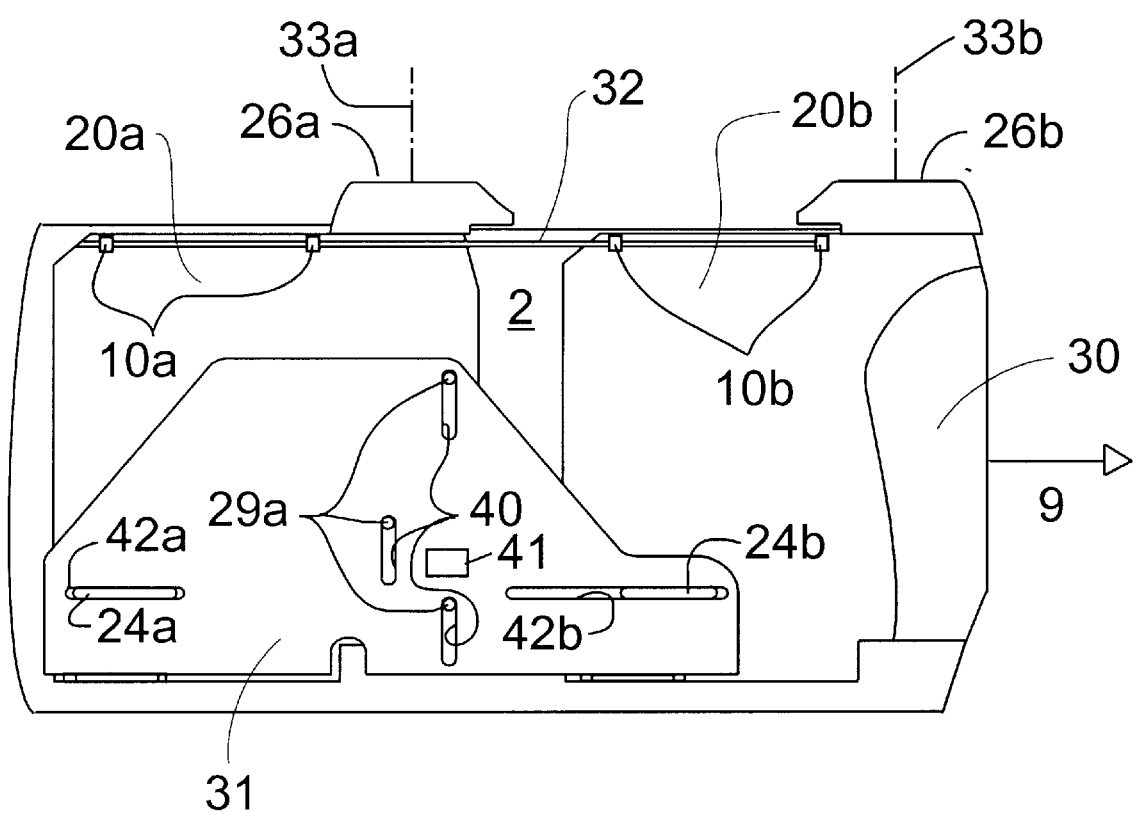
FIG. 4C illustrates two monocular telescopes and the guideplate of FIG. 4A in an extended binocular housing.

Referring still to FIGS. 4A and 4B, guideplate 31 is also used for displacement in the x and −x direction This adjustment is necessary to adjust the ocular; 26; 26b spacing which is different for every viewer A typical eyespacing is approximately 2.2 inches. In an embodiment of the invention the telescopes are typically approximately 2.2 inches wide (width measured in the x and −x direction). Consequently, when monocular telescopes 20a and 20b are in contact, with the minimum eyespacing as shown in FIG. 4B, objective lenses 21a, 21b and oculars 26a, 26b are approximately 2.2 inches apart. This result accommodates the typical eyespacing of 2.2 inches. However, this spacing can be made larger. Grip 30 can be engaged by a viewer. By keeping base 2 steady, telescope 20b can be displaced in the x and −x direction by engaging grip 30 and moving it in direction 9. The guideplate coupler 24a, and guidepins 29a on telescope 20a prevent guideplate 31 from having any displacement in the x and −x direction when a viewer displaces monocular telescope 20b via grip 30. However, telescope 20b can displace in the x and −x direction because aperture 42b acts as a track for guideplate coupler 24b on telescope 20b. Monocular telescope 20b is limited in the −x direction when it contacts telescope 20a that is fixedly secured in base 2. Telescope 20b is limited in the x direction by coming into contact with the outer edge of base 2 in the x direction. FIG. 4C illustrates compact binoculars 1 with light tight cover removed showing monocular telescopes 20a, 20b when grip 30 is in the fully extended position in the x direction. When telescope 20b contacts the edge of base 2, guideplate coupler 24 on monocular telescope 20b also contacts the outer edge of aperture 42b.

Reference is again made to FIGS. 2A and 2B. Here, internal friction is used to prevent undesired motion. Thick grease or other internal friction may be used between lens holders 27a, 27b and bolder track 22a, 22b respectively so that there is no undesired motion due to components of gravity, or any other external forces once a desired focus is obtained. Internal friction may also be used between base 2 and telescope 20b to prevent undesired motion in the x and −x direction from external forces once a desired eye spacing position between oculars 26a, 26b of monocular telescopes 20a and 20b has been obtained.

Figure 6A:
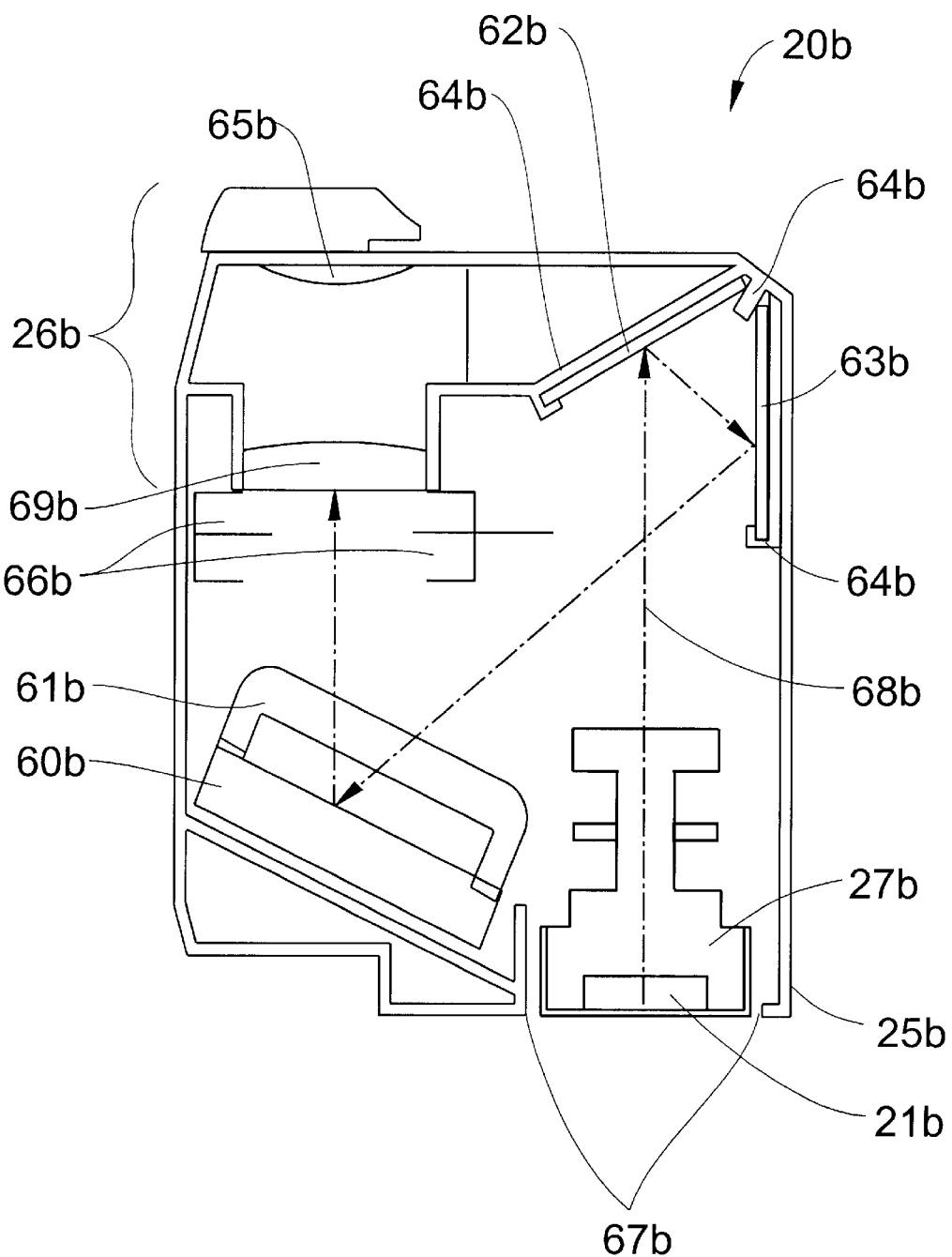
FIG. 6A shows the inner optical components of a monocular telescope.
Figure 6B:
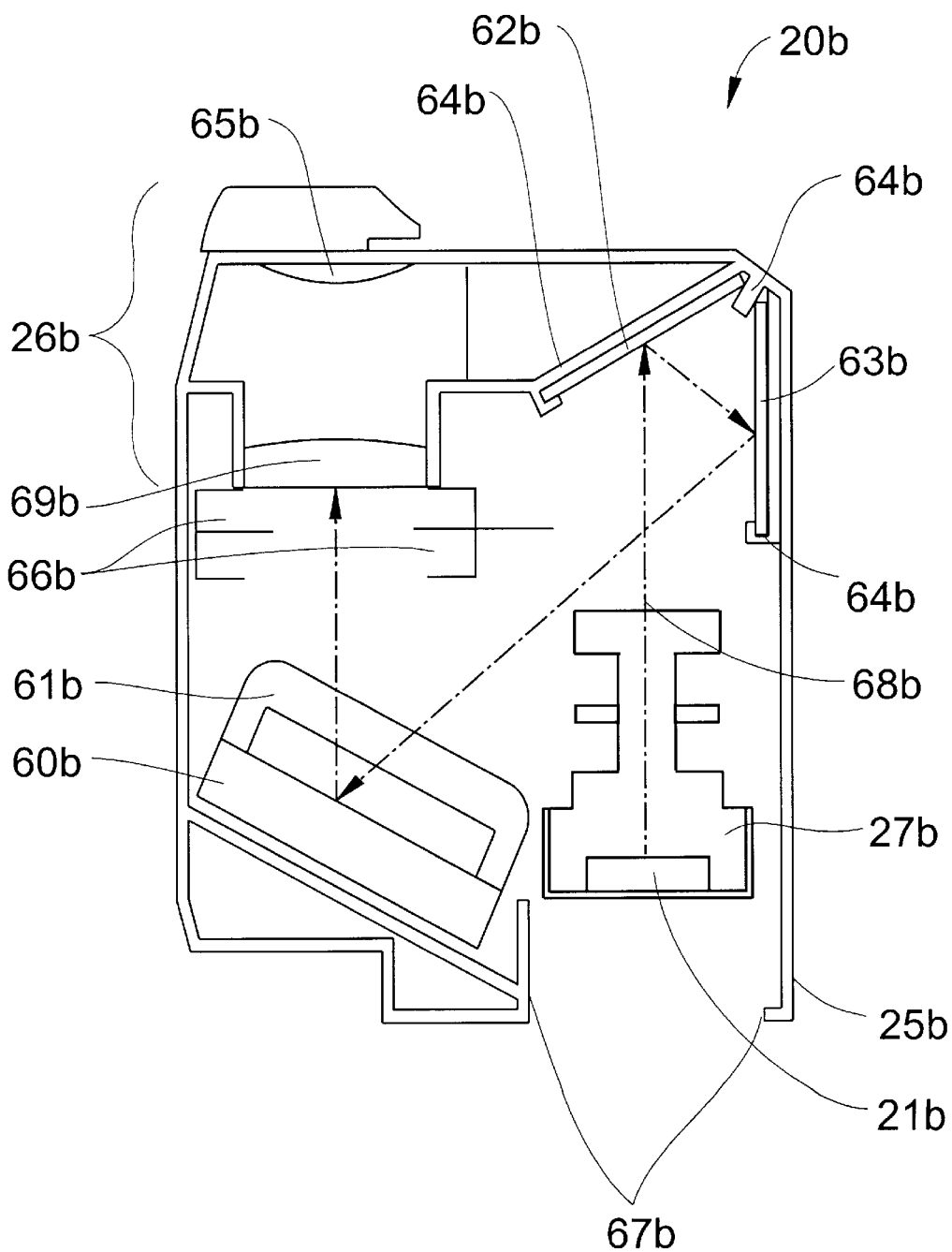
FIG. 6B shows the inner optical components of a monocular telescope.

Since the two monocular telescopes are used as binoculars, means must be provided for adjusting the location of the real image so that the images of both monocular telescopes 20a, 20b appear to fuse in each eye-lens 65a, 65b (see FIGS. 6A and 6B). If there is relative movement between monocular telescopes 20; 2Db in a direction orthogonal to the x-y planes, the image will appear to skew. If this motion is limited or eliminated, there will be no skew, and the image will appear to fuse in each eyeless 65; 65b. While any means can be used, in one embodiment, the objective lens 21a, 21b is mounted in lens holders 27a, 27b whose position (orthogonal to the x-y plane can be adjusted.

Figure 5A:
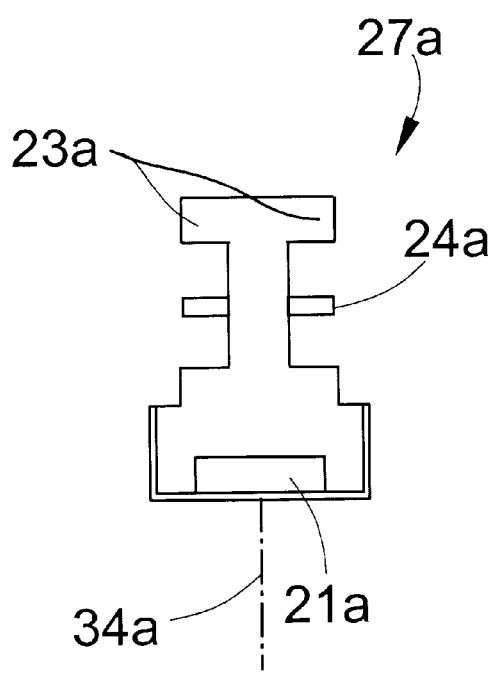
FIGS. 5A and 5B illustrate two views of an objective lens and lens bolder.
Figure 5B:
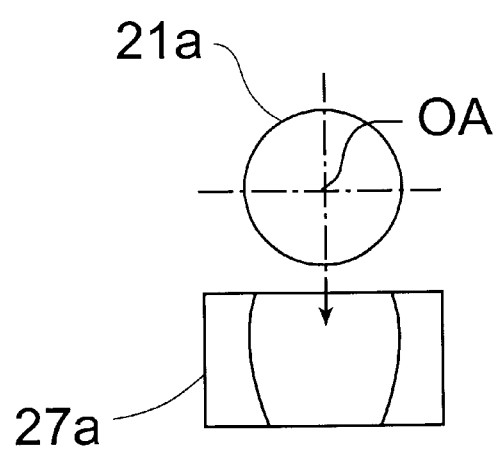

FIG. 5A depicts the lens holder 27a shown removed from telescope 20a. Lens holder 27a contains objective lens 21a. It is noted that lens holder 27b and objective lens 21b could also have been depicted. FIG. 5B depicts lens holder 27a and objective lens 21a turned 90 degrees so that objective lens axis 21a now is oriented perpendicular to the face of the paper. During manufacture, the objective lens 21a lens is placed in the lens holder 27a. When the proper orientation is obtained, the objective lens 21a is permanently fixed into the lens holder 27a with glue or adhesive. A motion of up to +/−1 mm has been found to be an appropriate tolerance.

Referring again to FIG. 4B, vertical stabilization bar 32 is mechanically coupled to telescopes 20a, 20b to prevent vertical movement. Stabilization bar 32 runs along track 28a on monocular telescope 20a and along track 28b on monocular telescope 20b. Track fasteners 10a, 10b, keep the bar 32 fixed in the tracks 28a, 28b. Bar 32 prevents vertical movement of the telescopes 20a and 20b with respect to each other. Preventing vertical movement with respect to each other allows the image to fuse in the eyepieces. Track 12 in light tight cover 3 (see upper FIG. 3A) prevents bar 32 from moving from its position when grip 30 is displaced. Lateral image alignment is less critical. If required, the angular position of a roof mirror can be adjusted before it is fixed into its final position.

Referring now to FIGS. 6A and 6B, monocular telescope 20b with objective lens 21b and lens holder 27b is shown in two different positions. For the remainder of the discussion, monocular telescopes 20a and 20b will not be differentiated. Instead the single monocular telescope 20b will be discussed. FIGS. 6A and 6B show the monocular telescope 20b with a protective lid (not shown) removed. The view is the reverse side of the monocular telescope 20b as shown in FIGS. 2A and 2B. Inside the shell case 25b, a roof mirror 60b is located opposite the ocular 26b in a corner of the shell case 25b. The roof mirror 60b is positioned at an angle with respect to the ocular 26b. The roof mirror 60b is held in its desired position by a roof mirror brace 61b. The brace 61 may be made of die cast aluminum although other materials are suitable. Other materials include, but are not limited to, dimensionally stable materials such as gas-filled engineering plastics, or die cast zinc.

A first flat mirror 62b and a second flat mirror 63b oriented at an angle with respect to each other are located in a corner of the shell case 25b diagonal to the corner containing the roof mirror 60b. The two flat mirrors 62b,63b are held in position by brackets 64b built into the shell case 25b. In another embodiment, the two flat mirrors 62b, 63b may also be mounted to the inside of the shell 25b case using adhesive. In an embodiment, three drops of adhesive in a triangular pattern are placed on the back of each mirror 62b, 63b, forming a low stress kinematic mount. Limiting the adhesive thickness to approximately 0.0023 inches has been found to be desirable to control the mount and the resulting stress. Adhesives that are suitable include, but are not limited to, RTV silicone, and Loctite 324. UV adhesives may also be used. In yet another embodiment, the two flat mirrors 62b,63b are held at an angle with respect to each other, both contained in a single brace (not shown). The brace is then secured to a wall of the shell case 25b. The brace is made from materials similar to the roof mirror brace. The second mirror 63b is substantially parallel to an end of the shell case 25b. The first mirror 62b is angled with respect to the second mirror 63b. The flat mirrors 62b,63b are preferably first surface mirrors with reflective surfaces on the front side of the glass facing inside shellcase 25b. The mirrors 62b,63b should have good surface accuracy to form a sharp image. It has been found experimentally that flatness errors of two fringes or less are acceptable.

In another embodiment the two flat mirrors 62b, 63b are located opposite the eyepiece 26b, and the roof mirror 60b is located opposite the objective lens 21b.

Referring still to FIGS. 6A and 6B, the monocular telescope 20b is equipped with an ocular 26b. In an embodiment of the invention the ocular 26b consists of two lenses, an eye-lens 65b, and a field-lens 69b in a "Ramsden" configuration. A real image plane (not shown) is located at approximately the field-lens 69b position. The ocular 26b is followed by a series of light baffles 66b.

The light baffles 66b lie between the ocular and the roof mirror 60b. The light baffles 66b prevent stray light coining from oblique angles from interfering with the real image at the ocular 26b. The source of the stray light is the objective lens 21b. It is noted that, when the objective lens is fully recessed as shown in FIG. 6B, stray light is additionally eliminated because the shell case 25b acts as an additional light baffle 67b exterior to the objective lens 21b. Light can also be reduced by blackening the inside of the shell case 25b as well as texturing the inner surfaces of the shell case 25b to suppress glazing angle reflections.

FIG. 6B depicts monocular telescope 20b with lens holder 27b and objective lens 21b in the fully recessed position.

Figure 7:
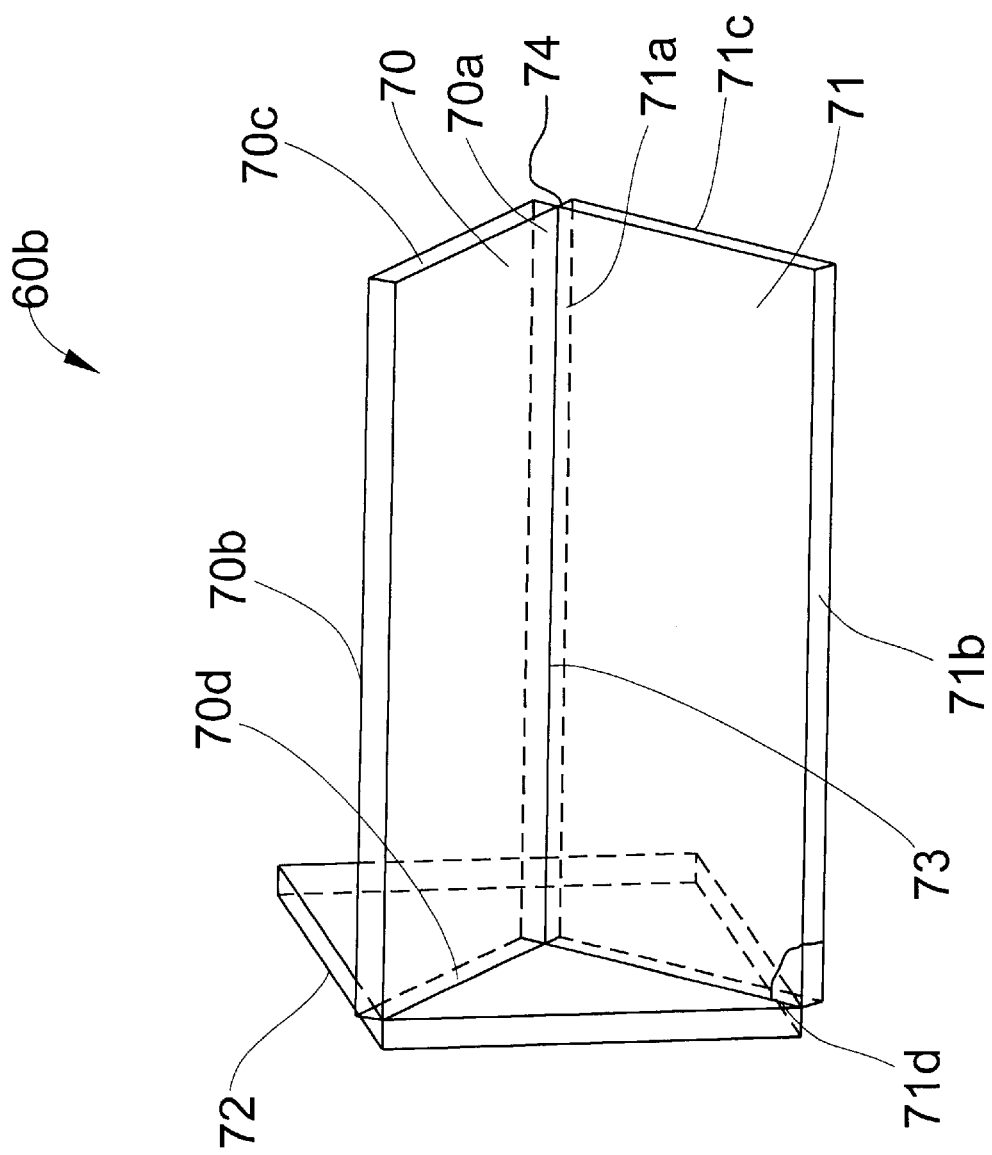
FIG. 7 illustrates a roof mirror.

Referring now to FIG. 7, a perspective of a typical roof mirror 60 is shown. Roof mirror 60 is comprised of a first flat mirror 70 and a second flat mirror 71, and a substantially rectangular glass substrate 72. Flat mirrors 70, 71 are preferable first surface mirrors. In order for the roof mirror to operate properly, flat mirrors 70, 71 have to oriented at 90 degrees with respect to each other. (A further discussion of roof mirror operation and manufacture is discussed below.) The first flat mirror 70 and the second flat mirror 71 meet at their respective edges 70a and 71a, along a line 73. Inevitably, a gap is created at the meeting line 73.

Referring again to FIGS. 6A and 6B, a light ray 68b is shown. Light ray 68b enters the objective lens 21b, is reflected by the first flat mirror 62b, onto the second mirror 63b. From the second mirror 63b, the light ray 68b is reflected to the roof mirror 60b. The ray 68b is reflected by both minors 70b, 71b of the roof mirror 60b and forms a real image at the field lens 69b and ultimately seen by the viewer at eye-lens 65b. In another embodiment, light enters the objective lens 21b, is reflected by the roof mirror 60b, onto the second mirror 63b. The light is reflected from the second mirror 63b onto the first mirror 62b, and ultimately forms a real image at the field lens 69b.

The light ray 68b is contained within a single plane (the Cartesian x-y plane) in the shell case 25b. Since additional optics are not necessary to guide the light ray out of the x-y plane, as in many conventional binoculars, this containment in a single plane contributes to the compactness of the binoculars 1 of the present invention. A feature of the present invention that keeps binoculars 1 in a very compact package is the containment of the light path in a single plane. Also contained in the same plane is the direction of adjustment for the objective lenses 21a,21b and the eyespacing for eyepieces 26a,26b. Therefore, all adjustment directions as well as the light path is contained in the x-y plane as shown in the figures.

The monocular telescopes 20a,20b have been found to perform well when their objective lens (21a,21b) has a focal length of approximately 110 mm, and an eyepiece (65a,65b) focal length of approximately 18 mm, giving a focal magnification of 6×. It is noted that the invention is not limited to the recited focal lengths.

The roof mirror 60 is located close to the image plane (not shown) in order to reduce image degradation caused by any angular misalignment. However, if the roof mirror 60 is too close to, or located at the image plane, the small gap between the two flat mirrors contained in the roof mirror 60 becomes visible in the eyepiece 65. Distance L (See discussion below) has been found to be a suitable distance to prevent image degradation and to prevent the gap to become visible. A distance L has been found to be ideal at 18 mm However, it is understood that the point of the placement of the roof mirror with respect to the image plane is to prevent degradation and the presence of the gap, so other suitable distances are also acceptable.

Roof Mirror Operation

Figure 8:
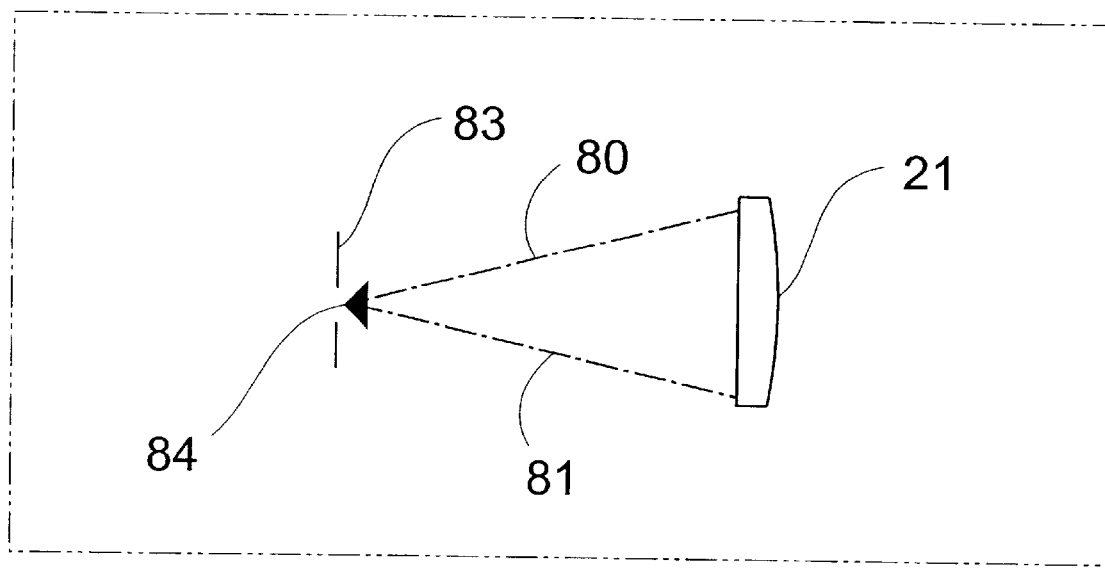
FIG. 8 illustrates an objective lens system.

Referenced now is FIG. 8 which shows the path of two representative rays 80 and 81 focused by an objective lens 21 in conventional fashion onto an image plane 83. Rays 80,81 both emanate from the same point on a distant object not shown. For sharp image definition, the rays must focus to substantially the same location 84 on image plane 83. Objective lens 21 is shown with a relatively short focal length in FIG. 8 to emphasize the angular convergence of rays 80, 81.

Figure 9:
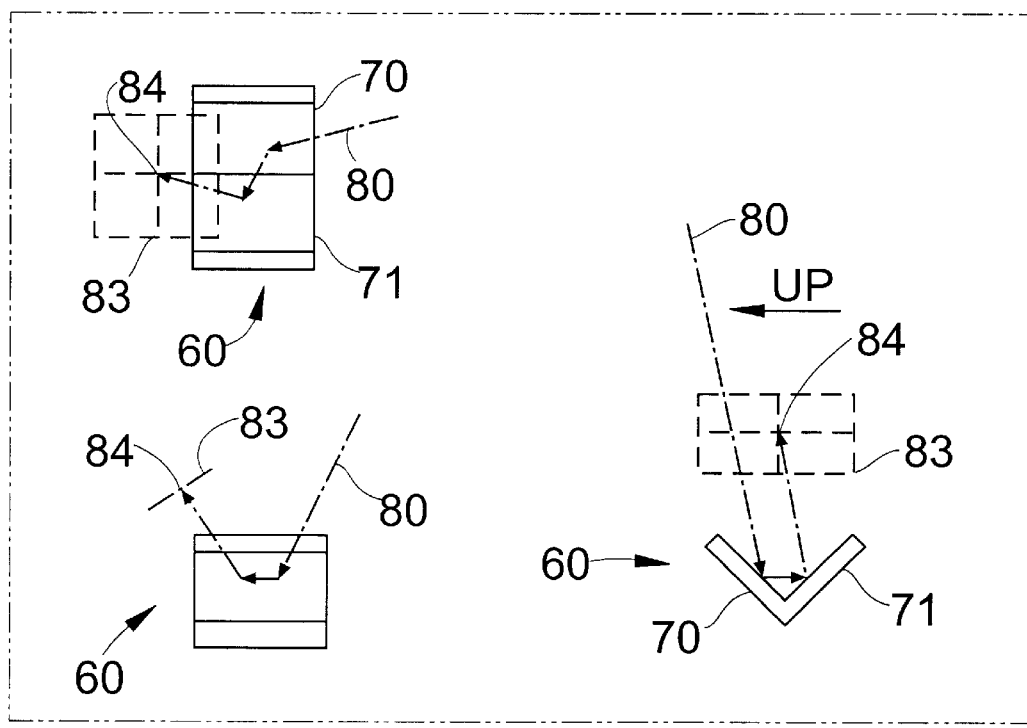
FIG. 9. illustrates in three views the propagation of a light ray first striking the upper mirror of a roof or system in proper alignment
Figure 10:
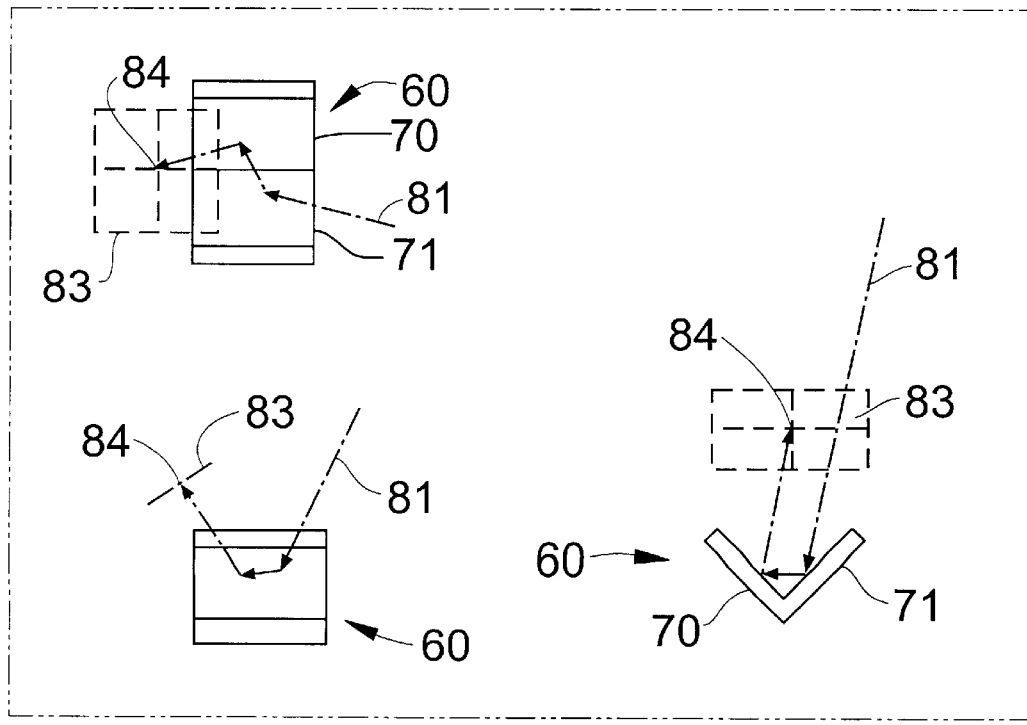
FIG. 10 illustrates in three views the propagation of a light ray first striking the lower mirror of a roof mirror system in proper alignment.
Figure 11:
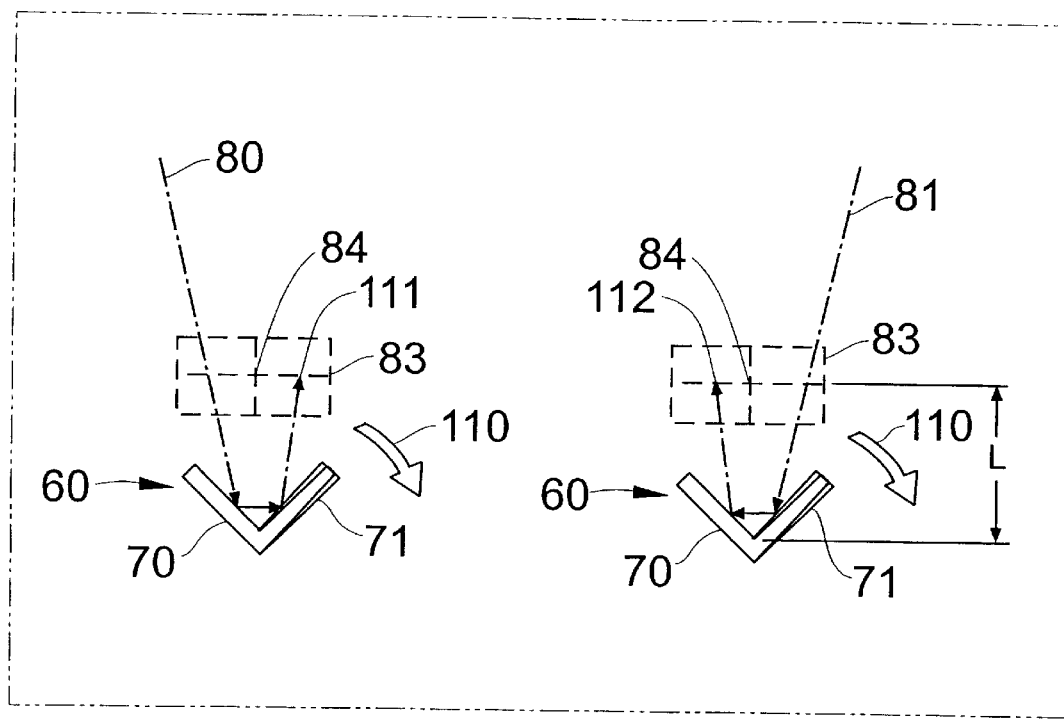
FIG. 11 shows two views of a roof mirror system in improper alignment.

Reference is now made to FIGS. 9, 10, and 11, which illustrate the effect of placing a roof mirror 60 in the path of rays 80,81 (in these figures objective lens 21 is not shown for clarity). Mirrors 70 and 71 form roof mirror 60. In FIGS. 9 and 10, the roof angle is exactly 90°. In FIG. 11, the roof angle has been changed to show the effect on rays 80 and 81.

Referring to FIG. 9, a path of ray 80 is illustrated. Ray 80 first strikes upper mirror to 70, then lower mirror 71, then image plane 83. Referring to FIG. 10, the path of ray 81 is shown. Ray 81 encounters the mirrors in opposite order, first striking lower mirror 71, then upper mirror 70, and finally image plane 83. However, so long as the roof angle between mirror 70 and mirror 11 is exactly 90°, both ray 80 and ray 81 will strike image plane 83 at the same point 84.

Referring now to FIG. 11, the effect of an improperly aligned roof mirror 60 is shown. The roof angle is larger than 90°. Mirror 71 has been rotated outward, as indicated by arrow 110. For the purposes of this diagram, the misalignment of mirror 71 has been grossly exaggerated. Ray 80 is seen to hit image plane 83 at location 111 located below the desired intersection point 84. Ray 81, however, is seen to hit image plane 83 at location 112 located above the desired intersection point 84.

Figure 12:
FIG. 12 illustrates a vertically shifted image resulting from one type of improper roof mirror alignment.
Figure 13:
FIG. 13 illustrates an image resulting from another type of improper roof mirror alignment in which only a horizontal portion of the resultant image has been affected.

It will be appreciated that any other rays, not shown in FIG. 11, which first strike upper mirror 70 will reach image plane 83 at a location lower than desired. Likewise, any rays which first strike mirror 71 will reach image plane 83 at a location higher than desired. This will produce image shear as illustrated in FIGS. 12 and 13.

If the roof mirror 60 is located quite close to objective lens 21, then essentially all rays passing through the top half of objective lens 21 will strike upper mirror 70 first. Thus, any angular error in the roof mirror will result in two complete images, shifted by an amount "D", as shown schematically in FIG. 12.

If the roof mirror 60 is located closer to image plane 83, the formula for linear misalignment, given later, still applies. However, the area of image shear will not cover the entire image, but will be confined to a horizontal stripe, as shown schematically in FIG. 13. Since the distance "L" is smaller, the tolerance on error angle "A" (defined below) is considerably relaxed. In the preferred embodiment shown in FIGS. 6A and 6B, the stripe is actually trapezoidal since one end of the roof mirror 60 is closer to the image.

If the roof mirror 60 were located at or very close to the image plane 83, then the image shear becomes very small and is confined to a very narrow band in the image. However, this roof mirror 60 location is not actually desirable, because any dirt or imperfections on the mirror are in sharp focus. In addition, any tiny gap between the mirrors 70, 71 will be seen as a black stripe across the image.

The amount of linear image misalignment "D" shown in FIGS. 12 and 13 is given by the approximate formula below, where "D" is the amount of linear misalignment, "A" is the angle of misalignment shown by arrow 110 (stated in radians and shown in FIG. 11), and L is the distance from the roof mirror 60 to the image plane 83 (illustrated in FIG. 11).

$$D=4CACL$$

If the image is viewed in an ocular of focal length EFL, the angular image shear is given by:

$$S=D/EFL=4CACL/EFL$$

Where S is the image shear in radians. If the distance "L" is large, the error angle "A" must be very small to keep the angular image shear S within acceptable limits. The resolution of the human eye under optimum conditions is about 1 arc minute. Experimentally, it has been determined that an image shear of 2–4 arc minutes is acceptable in the type of inexpensive monocular telescope 20a,b contemplated by the present invention.

In the monocular telescope 20a,b shown in FIGS. 6A and 6B, the focal length of eyepiece 65 is approximately 18 mm The distance "L" is also approximately 18 mm. This implies that the error angle "A" must be kept to less than 1 arc minute to keep the image shear to less than 4 arc minutes. Experimentally, it has been found that the fixture and mounting process illustrated and described below is capable of achieving this accuracy with high yield.

Roof Mirror Manufacture

Figure 14:
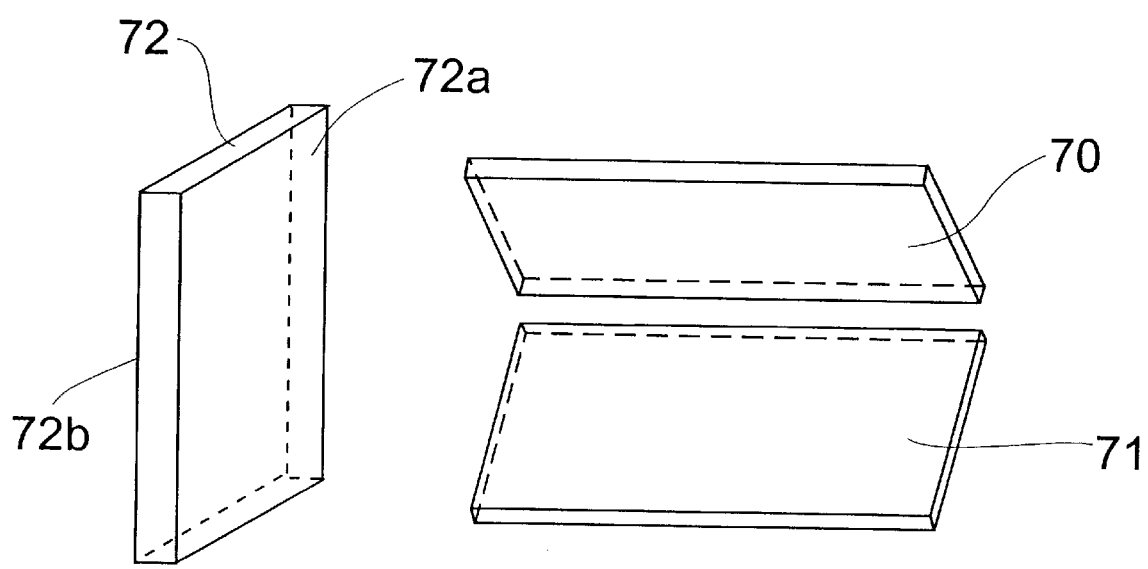
FIG. 14 illustrates two flat minors, and a glass substrate prior to roof mirror assembly.

FIG. 14 depicts a first flat mirror 70, a second flat mirror 71 and a glass substrate 72 for roof mirror assembly. The two mirrors are adhesively mounted to the glass substrate 72. Once the roof mirror is assembled it is attached to its brace.

Figure 15:
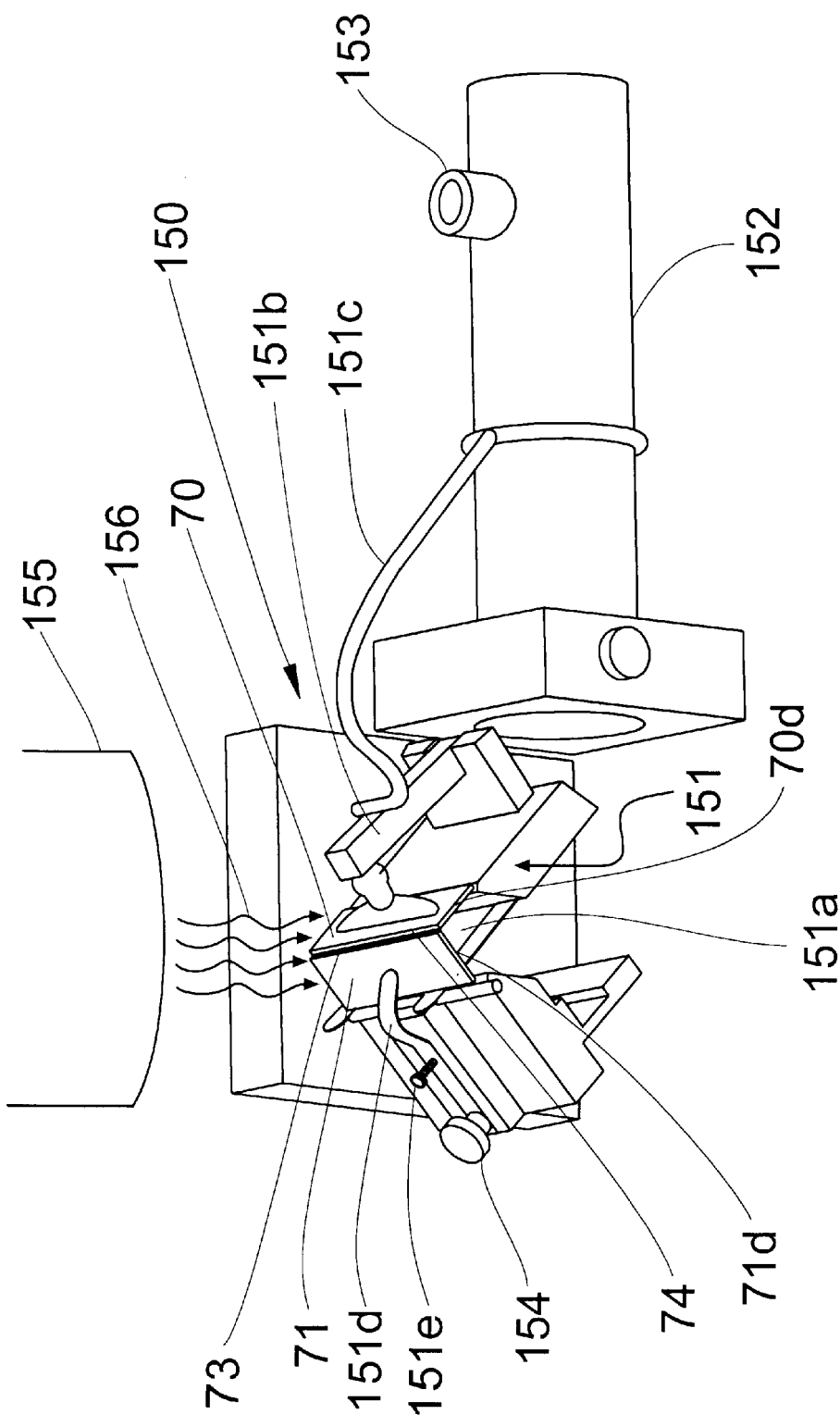
FIG. 15 illustrates a roof mirror alignment and manufacturing system.

FIG. 15 depicts a roof mirror alignment and manufacture system 150. As discussed above, the alignment of the flat mirrors 70, 71 is critical for good image quality. Flat mirrors 70, 71 mirrors must meet at a 90 degree angle within a few angular minutes of arc. It has been experimentally determined that angular errors of one arc minute caused an acceptable amount of image degradation. The mirrors 70, 71 are mounted to each other so that only a small gap 74 is created between the two mirrors 70, 71. A precision fixture 151 is used to hold the two mirrors 70, 71 in position on support block 151a. The fist mirror 70 is placed and held in position by first clamp 151b in the precision fixture 151 with the reflective first surface (not shown) facing down toward support block 151a. Clamp support 151c is placed over first clamp 151b. The second mirror 71 is then placed on support block 151a at an angle substantially equal to 90 degrees with the first mirror 70, with its reflective first surface (not shown) facing down. A second clamp 151d is used to hold the second mirror 71 in position. Support screw 151e is used to tighten second clamp 151d. The clamps 151b, 151d may be actual mechanical clamps. In another embodiment, however, clamping can also be achieved by placing the mirrors on support block 151a with the correct orientation, the surface of support block 151a containing grooves (not shown) that are connected to a vacuum pump (not shown). When the pump is activated, the mirrors 70, 71 are held firmly in place without distortion.

Referring again to FIG. 15, in the illustrated orientation, the reflective first surfaces of each mirror 70, 71 is 90 degrees with respect to each other. The mirrors 70, 71 are then adjusted by a pusher screw (not shown) so that the front edges of the mirrors are even. Since alignment of the mirrors 70, 71 is crucial, the alignment is checked optically using an autocollimator 152, interferometer or other conventional equipment. Alignment is achieved by a user looking through eyepiece 153. A user looking through eyepiece 153 will observe cross images (not shown) that should be illuminated. If there is no illumination, the mirrors 70, 71 are not properly aligned within the acceptable tolerance range. Once the cross images are illuminated, the mirrors are properly aligned to 90 degrees within the accepted tolerance range. In order to adjust the mirrors 70, 71 to proper alignment adjustment knob 154 is turned. Adjustments are made accordingly in order to align the mirrors to substantially 90 degrees within the accepted tolerance range. These adjustments have been helpful to detect slight tip errors caused by dirt particles between the mirrors 70, 71 and the support block 511a surface. Turning knob 154 moves precision fixture 151 so that mirrors 70, 71 angularly move with respect to each other. Clamps 151b, 151d prevent any unwanted movement of the mirrors 70, 71. The mirrors are then held in this position. Ultraviolet (UV) glue (not shown) is then applied along the line 73 where the mirrors 70, 71 touch. Care is taken so that both mirrors 70, 71 receive the application of the UV glue. It has been found that Norland Optical Adhesive NOA 61 and NOA 68 are good choices for an embodiment of the invention. However, the invention is not limited to these adhesives. Other suitable adhesives also suffice. The glue is then exposed to UV light 156 from a UV light source 155 for a time for several seconds. The presence of the UV light 156 will cause the glue to set. At this point the angle is verified. The autocollimater 152 is used as described above. The curing of the glue puts minimal stress on the mirrors so that any stress caused by the curing is within the accepted tolerance range of the roof mirror 60 configuration. The two mirrors are now attached by cured UV glue.

Once the two flat mirrors 70, 71 are attached, glass substrate 72 is attached. Referring still to FIG. 15, the entire roof mirror alignment and manufacture system 150 is turned on its side so that the flat mirror edges 70d, 71d are facing in the opposite direction of the force of gravity. However, UV source 155 remains in its original position. Additional UV glue is then applied along edges 70d, 71d of the two mirrors 70, 71. A substantially rectangular glass substrate 72 is placed on the edges 70d, 71d containing the glue (as shown in FIGS. 7 and 14). The glue is then cured for several seconds by exposure to UV light 156 to set the UV glue. The angle is then verified using autocollimater 152. The glue is then exposed to the UV light 156 for a longer period of several seconds to completely cure the glue.

In another embodiment of the invention, the roof mirror brace may be attached to the back of the mirrors. Three drops of adhesive are placed on the back of each mirror. The brace is then set to the back of the mirrors until the adhesive sets. An autocollimater is used to check the alignment of the mirrors as the adhesive cures.

A number of embodiments of the invention have been described. Nevertheless, it will be understood that various modifications may be made without departing from the spirit and scope of the invention. Accordingly, other embodiments are within the scope of the following claims.

What is claimed is:

1. A method of manufacturing a roof mirror, comprising the steps of.

placing a first reflective surface and a second reflective mace on a precision fixture such that a first end of the first reflective surface meets a first end of the second reflective surface at a substantially 90 degree angle;

optically checking the alignment of the reflective surfaces;

applying an adhesive along a line where the first end of the first reflective surface and the first end of the second reflective surface meet;

allowing the adhesive to set;

verifying that the angle between the first and second reflective surfaces has remained substantially 90 degrees;

applying an adhesive along a second end of the first reflective surface and a second end of the second reflective surface, wherein the second end of the reflective sure and the second end of the second reflective surface meet at a common point;

applying a substantially rectangular glass substrate to the end of the first reflective surface and the second end of the second reflective surface;

allowing the adhesive to set; and optically checking the alignment of the mirrors.

2. The method of claim 1, wherein the step of optically checking the mirrors comprises using an autocollimater.

3. The method of claim 1, wherein the steps of applying an adhesive comprises applying an ultraviolet glue.

* * * * *